US005426734A

United States Patent [19]

Nakaoka

[11] Patent Number: 5,426,734

[45] Date of Patent: Jun. 20, 1995

[54] APPARATUS FOR CONTROLLING A DISPLAYED IMAGE ON A RASTER SCAN DISPLAY

[75] Inventor: Yasushi Nakaoka, Suwa, Japan

[73] Assignee: Seiko Epson Corporation, Tokyo, Japan

[21] Appl. No.: 170,572

[22] Filed: Dec. 20, 1993

Related U.S. Application Data

[63] Continuation of Ser. No. 400,845, Aug. 30, 1989, abandoned.

[30] Foreign Application Priority Data

Sep. 6, 1988 [JP] Japan ............................... 63-222744

[51] Int. Cl.[6] ............................................. G06F 13/10

[52] U.S. Cl. ................................................... 395/166

[58] Field of Search ............... 395/162, 163, 164, 165, 395/166, 189, 190, 191

[56] References Cited

U.S. PATENT DOCUMENTS 4,028,675 6/1977 Frankenberg .................... 340/172.5
4,750,107 6/1988 Beggert .............................. 364/200
4,878,183 10/1989 Ewart .................................. 364/521
4,924,345 5/1990 Yamashita ........................... 358/160
4,970,636 11/1990 Snodgrass et al. .................. 364/518
4,980,828 12/1990 Kapcio et al. .................. 364/413.13
5,201,037 4/1987 Kohiyama et al. ................. 395/164

FOREIGN PATENT DOCUMENTS 62-254181 11/1987 Japan .

OTHER PUBLICATIONS

Rosenberg, *Dictionary of Computers, Information Processing and Telecommunications,* John Wiley and Sons, Inc., 1987, p. 191.

*MOS Memory Data Book,* Texas Instrument, 1986 (ed), pp. 1-52~1-57, 1-128~1-129, and last page.

*Primary Examiner*—Phu K. Nguyen

*Attorney, Agent, or Firm*—Stroock & Stroock & Lavan

[57] ABSTRACT

An apparatus for controlling an image display device such as the CRT includes a dual port memory having a first memory and a second memory. Data may be written into a first memory and read from the first memory at any time. Data is sequentially read from the second memory to provide information for the display. Data is manipulated during a data transfer cycle, a dynamic memory refresh cycle, a memory write cycle and a memory read cycle. Data is transmitted between the first memory and second memory during a data transfer cycle. A cycle reconciliation circuit prioritizes the manner in which the cycles occur giving top priority to the data transfer cycle.

9 Claims, 6 Drawing Sheets

FIG. 1
PRIOR ART
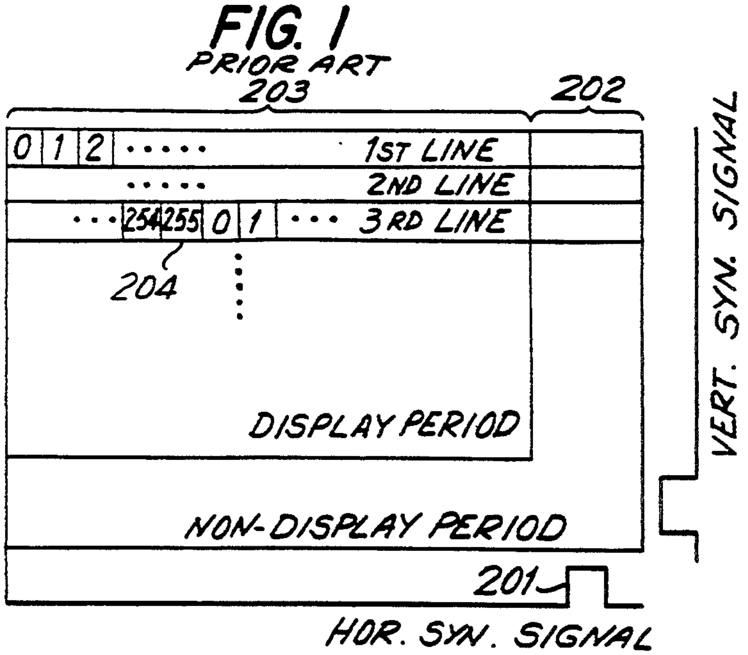
FIG. 2
PRIOR ART
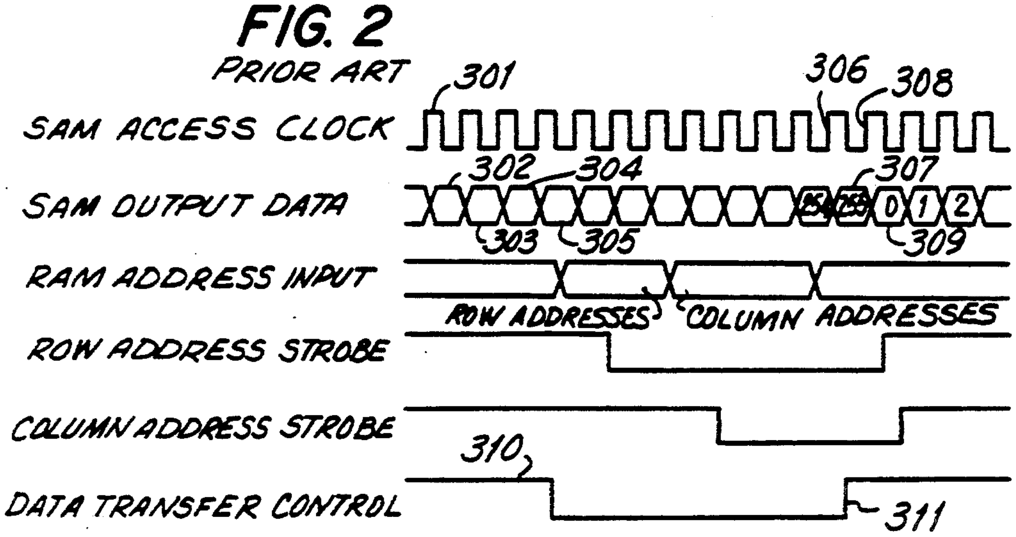
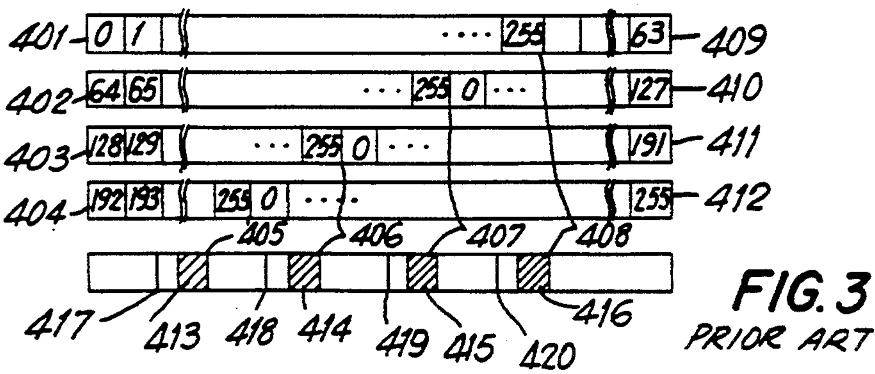
FIG. 3
PRIOR ART

APPARATUS FOR CONTROLLING A DISPLAYED IMAGE ON A RASTER SCAN DISPLAY

This is a continuation of U.S. patent application Ser. No. 07/400,845 filed on Aug. 30, 1989 now abandoned.

BACKGROUND OF THE INVENTION

The present invention is directed to an apparatus which controls the display of a raster scan display device, and in particular, to an apparatus having a dual port memory for storing information which is to be displayed.

The use of dual port memories for storing information to be displayed on a raster scan display device is known in the art. Such conventional devices utilize a dual port memory having a random access memory (RAM) and a sequential access memory (SAM) which are controlled by a processor for storing and outputting information. The memory includes two outputs and two inputs and is capable of transferring data between the RAM and SAM. To produce a display, the memories are utilized to store information about characters stored at successive addresses, and color information characteristics of the characters such as flicker display.

The information concerning the dots forming graphical images or color information is successively read from the SAM. The characters are then converted into a different pattern, the colors are selected or the data is otherwise processed. This transmitted data is then fed to a display device. The processor outputs instructions for writing the information into the RAM at arbitrary addresses or for reading the information from the RAM already stored at the arbitrary addresses. An address selecting signal and a control signal are input to the RAM to cause information to be written in or to be read from the RAM. These input signals also act to refresh the memory. The memory is a dynamic memory and therefore it is periodically refreshed to prevent the stored information from being lost. Another function of the input signal is to transfer data. Additionally, a limitation is imposed by the amount of data which may be continuously read from the SAM.

By way of example, in a device utilizing a dual port memory of 64 kilowords by four bits, the maximum amount of data which can be continuously read out is 256 words. Therefore, 256 words of information is transferred from the RAM to SAM at a single time. It follows that when a display is initiated, i.e., when data is first read from the SAM, the data to be read out must be transferred from the RAM to the SAM.

To perform these functions, the device performs four memory cycles. When a raster scan display device such as a CRT, a liquid crystal display, a plasma display or the like displays an image, video data traces a succession of horizontal lines beginning with the upper left position of the display screen. As seen in FIG. 1, the right hand end of a horizontal line is followed by the left hand end of the succeeding horizontal line. The upper right hand end of a line is followed by the upper left hand end of the succeeding line of information. During the interval between the end of one horizontal line and the start of the succeeding horizontal line, a horizontal synchronization pulse 201 is produced to inform the display device of the occurrence of the end of a horizontal scan. Also a blanking time period 202 is output during this interval. Therefore, a data transfer cycle for beginning the next line is able to use this blanking time.

However, if the 255th data word, indicated as 204, is read while the horizontal line is being displayed, then data transfer for reading next word of data, the 0th word, is needed. Specifically, it becomes necessary to transfer data from the RAM to the SAM at the same time data is being read from the SAM. In such a case, a very stringent limitation is imposed on the moment at which the data transfer cycle is executed.

Reference is now made to FIG. 2 wherein a timing chart for such a transfer is provided. A SAM access clock pulse 301 rises causing image data 302, 303, 304 . . . to be successfully read from the SAM at successive addresses. As this operation is repeated, a leading edge 306 of a SAM clock pulse causes the 255th data item, indicated at 307, to be read out from the SAM. If the process were to be continued further, then data can no longer be read from the SAM port because of the limitation of the SAM capacity, i.e. there would be no more data to read. For this reason, the data transfer cycle is carried out. If the transfer is not completed before the next leading edge 308 of a SAM access clock pulse, then incorrect data would have to be read when in fact data 309 should be the 0th data item.

During the data transfer cycle, leading edge 211 of a data transfer control signal 310 actually causes the transfer. Therefore, the data transfer cycle must be executed in such a way that the leading edge 311 occurs between leading edges 306 and 308 of the SAM axis clock pulses 301. The method used in the prior art is to fix the first address of the displayed image or to place some limitation if the first address is not fixed.

When a limitation is provided some of the first (lowermost) bits of the address are fixed. Thus, the position at which data transfer is needed during the display of an image is predetermined. The moment in time corresponding to this position is reserved for the data transfer cycle. One example of this method is illustrated in FIG. 3 in which the relation of the horizontal position displayed on the view screen to the address in the memory used for the display is shown. In this example, each horizontal line is segmented into 320 addresses. If the limitation is set so that the first six bits of the first address are given values of 0 and the initial data read from the SAM at the beginning of display operation consist of one of only four specific data items such as the 0th data item 401 on the first horizontal line, the 64th data item 402 on the second horizontal line, the 128 data item 403 on the third horizontal line and the 192nd data item 404 ion the fourth horizontal line, neither the 256th data item or the 320th data item is included. In this example, since the dual port memory is designed to store 64 kilowords by four bits, the 256th data item is the 0th data item of the next line or the 256th word to be output. Considering the position at which the data transfer is needed for each of these data items, between the 255th data word and 0th data word positions 408, 407, 406, 405 are respectively assumed to be the desired position for the lines beginning with the 0th, 64th, 128th, 192nd data words. It is at these positions that the data transfer cycle is performed and the reading operation is repeated with the 0th data word. The data read out at the end of the line consist of the 63rd data item 409 on the first line, the 127th data item 410 on the second line, 191st data word 411 on the third line and the 255th data word 412 on the fourth line. The data read out at the beginning of the succeeding line consists of the four data-words in the same manner as in the case of the first four lines. Therefore, the position at which the data transfer occurs which is necessary for the next line always occurs at one of the locations 405, 406, 407 and 408. This way data transfer is required to occur at one of four locations for every line displayed.

Each line is assigned four time periods 413, 414, 415 or 416 corresponding to the point in time at which the data transfer cycle must occur. A decision is then made to determine whether the data transfer cycle must occur based upon the address at the preceding positions for 417, 418, 419 and 420. The data is read out and compared with the 240th data word at positions 417, 418, 419 or 420. When data read out exceeds the 240th data word execution of other cycles is prevented and the data transfer cycle is carried out at precisely the previously assigned time either 413, 414, 415 or 416 which ever occurs next. If the 240th data word is not exceeded it is not necessary to transfer the data and another cycle is carried out as requested. In this manner data transfer is correctly executed.

These prior art techniques have been satisfactory, however they suffer from the limitation that timing limitations are imposed on the setting of the address at which a display is initiated. This makes it impossible to display the image data stored in a desired region in the memory.

Accordingly, it is desired to provide an apparatus for controlling the raster display which overcomes the disadvantage of the prior art described above to permit any image data stored in a desired region in the memory to be displayed on a view screen.

SUMMARY OF THE INVENTION

Generally speaking, in accordance with the present invention, an improved apparatus for controlling a raster scan display is provided. An apparatus for controlling a raster scan display includes a dual port memory. The memory includes a RAM and a SAM. Two inputs and two outputs are provided on the dual port memory allowing transfer of data between the RAM and SAM. The dual port memory is utilized to store information for providing a display. The memory is a dynamic memory and therefore is operated utilizing four cycles, a dynamic memory refresh cycle, a memory write cycle, a memory read cycle and a display data transfer cycle. A cycle reconciliation circuit causes a display data transfer cycle to occur at an arbitrary time according to the condition of the display thereby allowing image data stored in a desired region in the memory to be displayed on the viewing screen.

Accordingly, it is an object of the invention to provide an improved apparatus for controlling a raster scan display.

It is another object of the invention to provide an apparatus for controlling a raster scan display which imposes no limitation on the address at which a display is started and permits image data stored in the desired region in a memory to be displayed on a viewing screen.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a graphical representation of the display of data on a view screen in accordance with the prior art;

FIG. 2 are the timing signals for displaying data on a view screen in accordance with the prior art;

FIG. 3 is a schematic view of the horizontal lines and data transfer cycle in accordance with the prior art;

DETAILED DESCRIPTION OF THE PREFERRED EMBODIMENTS

Figure 4:
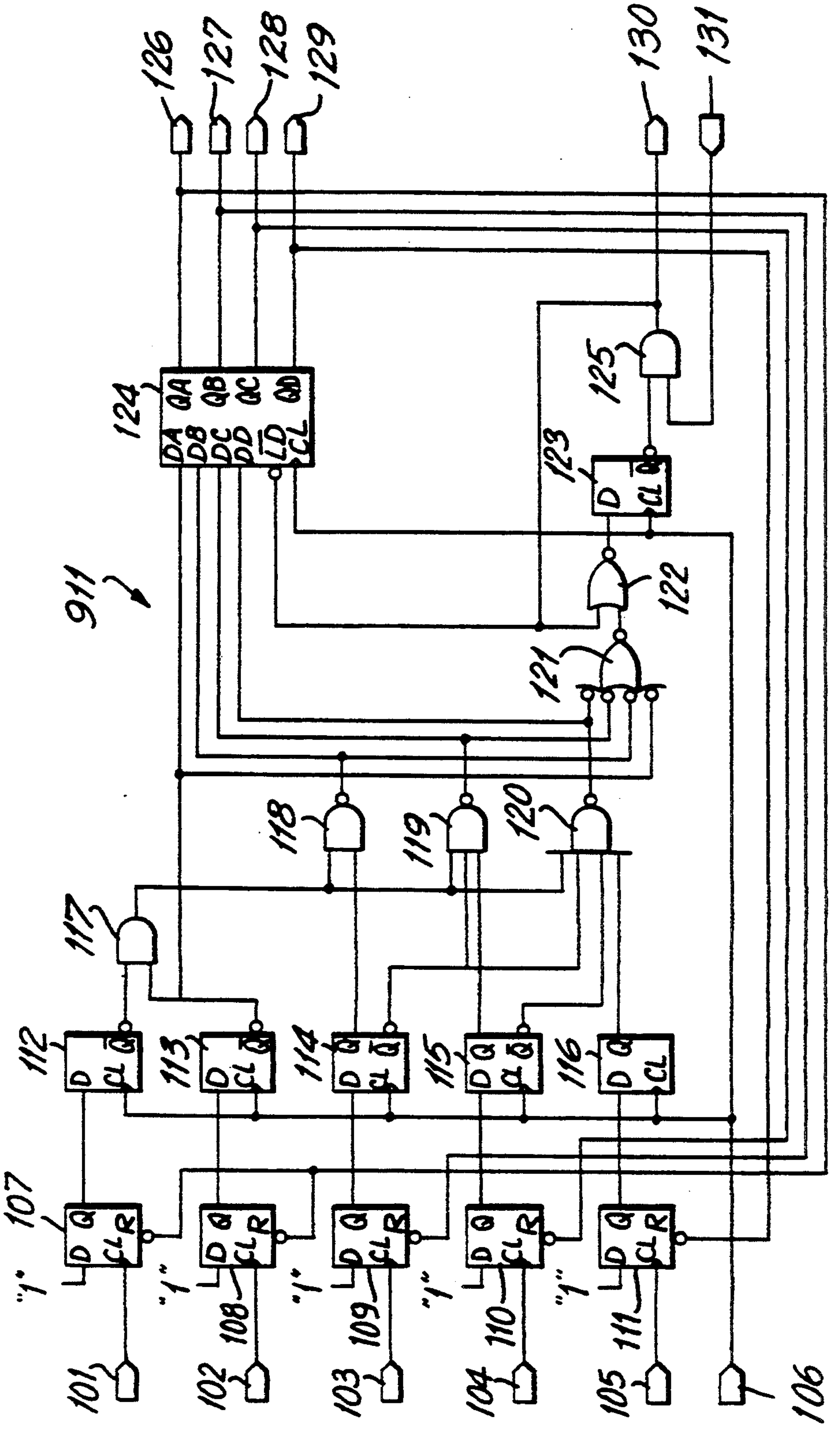
FIG. 4 is a circuit diagram of a cycle reconciliation circuit constructed in accordance with the invention.

Reference is first made to FIG. 4 wherein the cycle reconciliation circuit, generally indicated at 911, constructed in accordance with the invention is provided. Reconciliation circuit 911 includes a first flip flop 107 having an input 101 as its clock input and a constant input of 1 as its D input. Similarly, a flip flop 108 has as its clock input an input 102 and has as its D input a constant input of 1, a flip flop 109 has as its clock input an input 103 and a constant input of 1 as its D input, a flip flop 110 has as its clock input the input 104 and a constant value of 1 as its D input, while a fifth flip flop 111 has an input 105 as its clock input and a constant value of 1 as its D input. A second set of flip flops 112, 113, 114, 115 and 116 has as a common clock input an input 106. Flip flops 112, 113, 114, 115 and 116 have as their respective D inputs the Q outputs of flip flops 107, 108, 109, 110 and 111 respectively.

An AND gate 117 has as a first input the inverted $\overline{Q}$ output of flip flop 112 and the inverted Q output of flip flop 113. A NAND gate 118 receives as its first input the output of AND gate 117 and the Q output of flip flop 114. A NAND 119 receives as its first input the output of AND gate 117, the inverted $\overline{Q}$ output of flip flop 114 and the Q output of flip flop 115. A NAND gate 120 receives as its first input the output of AND gate 117, the inverted $\overline{Q}$ output of flip flop 114, the inverted Q output of flip flop 115 and the Q output of flip flop 116. A negative logic NOR gate 121 receives the outputs of NAND gates 118, 119 and 120 and the $\overline{Q}$ output of flip flop 113.

A register 124 receives the inverted $\overline{Q}$ output of flip flop 113 as its DA input, the output of NAND gate 118 as its DB input, the output of NAND gate 119 as its DC input and the output of NAND gate 120 as its DD input.

The signal input at input 106 is received as the clock input.

A NOR gate 122 receives a first input from negative logic NOR gate 121. A flip flop 123 receives the output of NOR gate 122 as its D input and the input 106 as its clock input. An AND gate 125 receives an input from an input 131 and the inverted $\overline{Q}$ output from flip flop 123 as its second input to produce an output 130. NOR gate 122 receives output 130 as its second input. Register 124 receives the inverted output of AND gate 125 as its $\overline{LD}$ input and produces a first output QA to an output 126, a second output QB to output 127, a third output QC to output 128 and a fourth output QD to a fourth output 129. Flip flops 107, 108, 109, 110 and 111 receive the inverted outputs QA, QB, QC and QD respectively as their reset inputs.

Signals for requesting the execution of a particular memory cycle such as the display data transfer cycle A, the memory refresh cycle B, memory write cycle C or memory recycle D are input at input terminals 102, 103, 104 and 105 respectively. These four memory cycles are performed by switching the logic level of each of these input terminals from zero to one. The four output terminals 126, 127, 128 and 129 also correspond to respective cycles A, B, C and D.

Only the cycle corresponding to the input terminal having logic value zero is permitted to be executed. Output terminal 130 produces a logic value one to indicate that a cycle is presently being executed. When the execution of a cycle is completed, the logic value at input terminal 131 is caused to become zero. Clock pulses for the display are then applied to input terminal 106. The cycles other than cycle A, such as memory read cycle D, are prohibited by varying the signal level from logic zero to logic one at output terminal 130. The request for this inhibition is referred to as request r. When no memory cycle is requested and no memory cycle is being executed, all of the D flip flops 107–116 are reset. The output Q of each D flip flop assumes a logic value zero and the output $\overline{Q}$ assumes the logic value one. D flip flop 123 is set so that the Q outputs take a logic value one while the outputs $\overline{Q}$ become a logic value zero. Output terminals QA, QB, QC and QD of synchronously loaded four bit register 124 have a logic value of one.

When input terminal 104 changes the input signal from zero to one memory write cycle C becomes requested. The D input of D flip flop 110 is maintained at one, the flip flop is set. D flip flop 115 is set upon the next occurring leading edge clock signal applied to clock input at terminal 106. Similarly, when other requesting signals are applied to input terminals 101, 102, 103 or 105, the corresponding D flip flops 107, 108, 109 and 111 and D flip flops 112, 113, 114 and 116 operate in the identical manner to request the corresponding cycle. Therefore, the D flip flops 112, 113, 114, 115 and 116 indicate the request for cycles r, A, B, C and D.

When neither the request r nor the request for cycle A is made, the output from NAND gate 117 becomes one. The output from NAND gate 118 becomes zero if neither the request r nor the request for cycle A is made and a request for cycle B is made. The output from NAND gate 119 becomes zero if there is no request for cycles r, A or B and if only a request for cycle C is made. The output from NAND gate 120 becomes zero if there is no request for cycles r, A, B and C and if only a request D is made. Accordingly, the priority is set so that A>B>C>D. If two or i more requests are made simultaneously, requests other than the requests to which top priority is given are reserved. When request r is made, requests B, C and D are reserved.

The output from negative logic NOR gate 121 becomes one when no request is reserved. Since D flip flop 123 is set, the output from AND gate 125 is zero. In this state, register 124 can be loaded. The NOR gate 122 inverts the output from negative logic NOR gate 121. Therefore, if no cycle is requested, or if any cycle is requested but reserved (state 1), inputs DA, DB, DC and DD on register 124 all assume a value of one. The D input of the D flip flop 123 also becomes one. It follows that clock input 106 produces a signal that rises but the condition of register 124 and D flip flop 123 does not change.

If there is a non-reserve request (state 2), then one of inputs DA, DB, DC or DD of register 124 corresponding to requested cycle A, B, C or D becomes zero. Then the output from negative logic NOR gate 121 becomes one. This causes the D input of the D flip flop 123 to become zero. In the second state, if the clock input 106 has a signal which rises then outputs QA, QB, QC and QD of register 124 take on the same value as respective inputs DA, DB, DC and DD. This results in only one of outputs 126, 127, 128 and 129 having a zero value corresponding to the cycle A, B, C or D to be executed.

The D flip flops 108, 109, 110, 111 holding the requests for the appropriate cycles A, B, C and D to be executed are reset. When cycle A is executed the D flip flop 107 holding request r is reset. Concurrently, D flip flop 123 is reset and the $\overline{Q}$ output becomes one. At the same time, input 131 inputs a value one so the output from AND gate 125 becomes one. Therefore output 130 produces a value one indicating that a cycle is being executed. Input $\overline{LD}$ of register 124 also becomes one and the register is retained. Therefore, its output is retained regardless of input clock pulses. Also, the output from NOR gate 122 becomes zero regardless of the output from NOR gate 121 keeping D flip flop 123 reset.

When an executed cycle is completed, the value of input 131 becomes zero indicating the completion of a cycle. Data can again be loaded into register 124. The output from NOR gate 122 inverts the output from negative logic NOR gate 121. Simultaneously, the request for the cycle having just been executed in now withdrawn. The reserve cycle requests are then changed so that a cycle is requested in accordance with the priority of the reserved requests, the remaining requests are reserved, or no request is made. If there is a selected request, the process returns to state 2. If there is no selected request then the process is returned to state 1 and the operation is repeated.

To execute the data transfer cycle, the necessity for the data transfer cycle is first determined from addresses contained within a memory. The current data transfer cycle must be predetermined because it takes a discreet time value for the cycle being executed to end and time is required between the beginning of the execution of the data transfer cycle and actual data transfer. At this time, the value at input 101 is changed from zero to one resulting in the request r being made. This reserves all other requested cycles other than the request for data transfer cycle A. Accordingly, the process waits until a predetermined time period has elapsed. This predetermined time period is long enough to terminate even the longest cycle being executed even if execution of the current cycle was begun immediately before reserving all the other cycles in response to the request r. Subsequently, request for the data transfer cycle execution is made to execute the data transfer cycle when it is needed. For this purpose, the value at input 102 is switched from zero to one. At this time, no cycle is being executed and therefore the time between the beginning of an execution and the end of an execution of a current cycle is always constant. Consequently, the instant at which data is to be transferred may be correctly predetermined. After the data transfer execution, request r is also reset. Thus, the process returns to the condition prior to data transfer execution. If there are any reserved requested cycles, the requested cycles are then carried out in order of priority.

Figure 5:
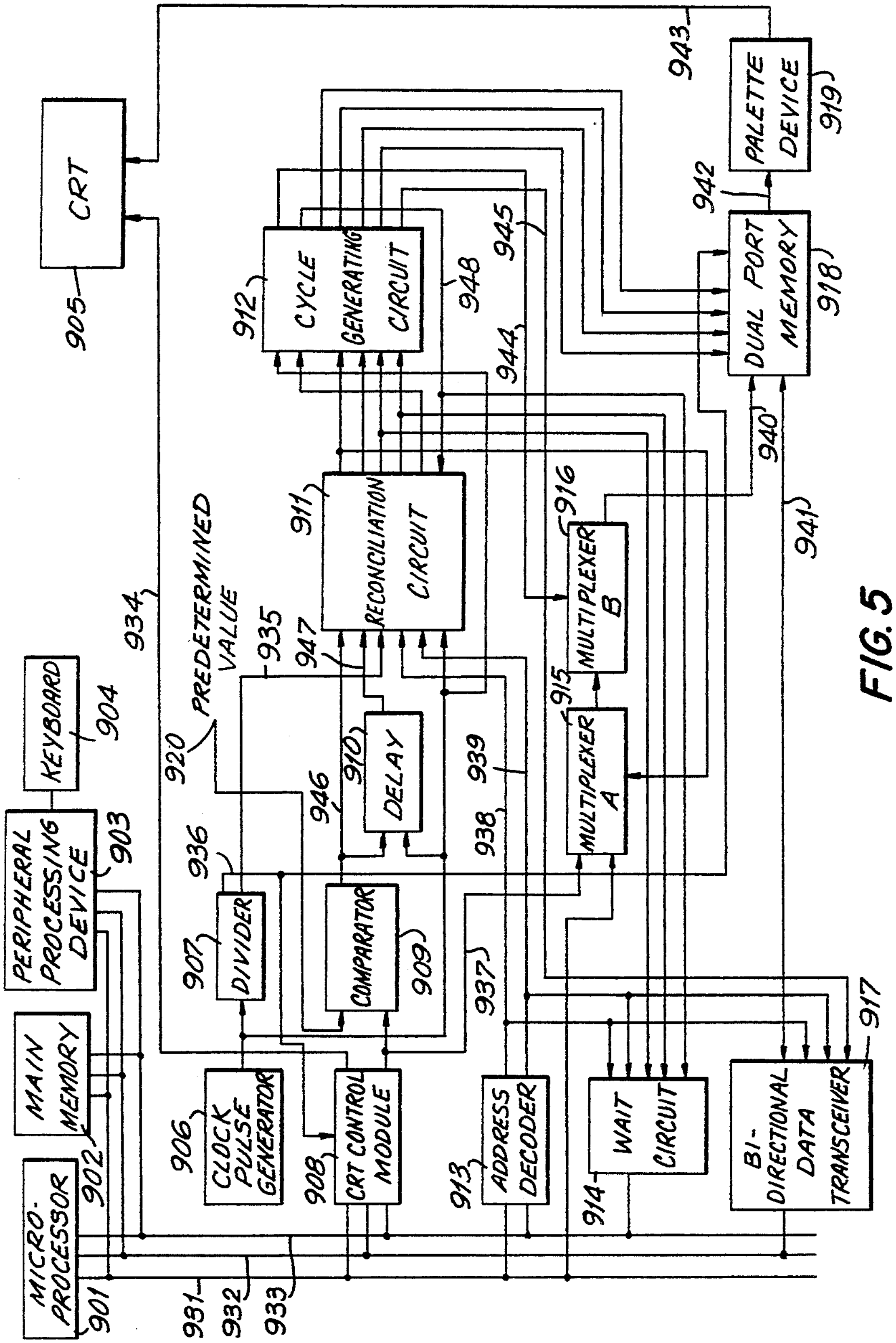
FIG. 5 is a block diagram of an apparatus for controlling a raster scan display device constructed in accordance with the invention.

Reference is now made to FIG. 5 in which an embodiment of the invention utilizing reconciliation circuit 911 is provided. The device shown in FIG. 5 is a fully addressable display device utilizing dual port memory and reconciliation circuit 911. This display device is particularly well-suited to be connected with a microcomputer including a microprocessor 901, a main memory 902, a peripheral processing device 903 and a keyboard 904. Microprocessor 901 communicates with an external device through an address bus 931, a data bus 932 and a control status signal line 933. Microprocessor 901 inputs various parameters for CRT control module 908, such as display parameters, horizontal and vertical synchronization times, the number of display dots, the positioning of the synchronization pulse and the address at which the display is first to be provided. A clock pulse generator 906 generates a fundamental clock pulse having a frequency of 25.175 MHz to aid in providing the display. The clock pulses are input to a frequency divider 907, a delay element 910 and reconciliation circuit 911.

Divider 907 divides the frequency of the fundamental clock pulses by two to produce clock pulses 936. Clock pulses 936 are input to CRT control module 908 for display into a dual port memory 918. In response to incoming clock pulses 936, CRT control module 908 produces horizontal and vertical synchronizing signals 934 to a CRT image control apparatus 905. CRT control module 908 outputs a memory address 937. A comparator 909 compares address 937 with a predetermined value 247, indicated at 920. If the values coincide, comparator 909 outputs a signal 946 indicating the request r to reserve the request for those cycles which are not data transfer cycle A. Delay element 910 delays signal 946 indicating a request r by eight clock pulses, to produce a signal indicating the request A for the data transfer cycle. Divider also divides the frequency of a fundamental clock pulse by 384 to produce a signal 935 input to reconciliation circuit 911 for requesting the dynamic memory refresh cycle D.

When data is written into dual port memory 918, microprocessor 901 causes address decoder 913 to produce a signal indicating the request for the memory write cycle C which is input to reconciliation circuit 911. When data is read from dual port memory 918, microprocessor 901 causes address decoder 913 to output a signal 939 causing reconciliation circuit 911 to request a memory read cycle D. In response to the request for the cycle, reconciliation circuit 911 performs a reconciliation as described above and delivers the requested cycle to a cycle generating circuit 912.

Figure 6:
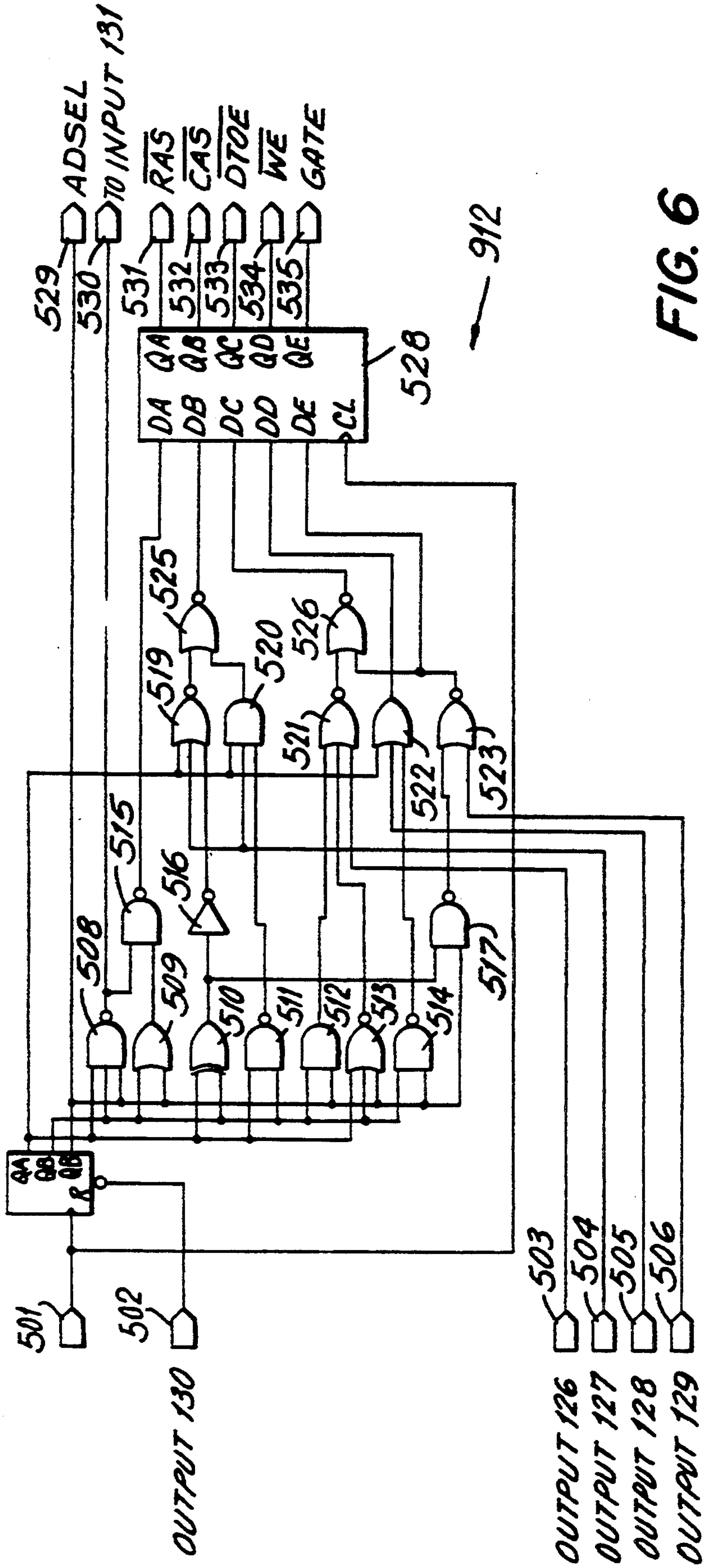
FIG. 6 is a schematic diagram of a memory cycle generating circuit constructed in accordance with the invention.

As seen in greater detail in FIG. 6, cycle generating circuit 912 includes a three bit synchronous reset counter 507 which receives a clock signal input from input 501. A NAND gate receives the QA output of flip flop 507 as a first input, the QB output of flip flop 507 as a second input and the QC output of flip flop of 507 as a third input. The output of NAND gate 508 is output 530, coupled to input 131 of FIG. 4. An OR gate 509 receives QB and QC outputs of flip flop 507. An EXCLUSIVE OR gate 510 receives the QA and QB outputs of flip flop 507. NAND gate 511 also receives the QA and QB outputs of flip flop 507. AND gate 512, NOR gate 513 and NAND gate 514 receive the QB and QC outputs as their inputs. A NAND gate 515 receives the outputs of OR gate and NAND gate 508 while an invertor 516 inverts the output of EXCLUSIVE OR gate 510. A NAND gate 517 receives the output of EXCLUSIVE OR gate 510 and the QC output,of flip flop 507.

A NOR gate 519 receives the QA output of flip flop 507 as one output, the output of invertor 516 as a second output and the output of output 127 which is input at an input 504. An AND gate 520 also receives the QA output of flip flop 507, the input at input 504, corresponding to the output of output 127 of FIG. 4, and the output of NAND gate 511 as its respective inputs. A NOR gate 521 receives the output of AND gate 512, NOR gate 513 and the input from input 503 which corresponds to the output at output 126 of FIG. 4 as its respective inputs. An AND gate 522 receives the QA output of flip flop 507, the input from input 505 corresponding to output at output 128 of FIG. 4 and the output of NAND gate 514 as its inputs. A NOR gate 523 receives its inputs at the output of NAND gate 517 and the input from input 506 corresponding to the output produced by output 129 of FIG. 4. A NOR gate 525 receives as inputs the output of NOR gate 519 and AND gate 520. A NOR gate 526 receives as its input the output of NOR gate 521 and NOR gate 523.

A five bit flip flop 528 receives a clock signal from the clock signal input at the input 501, DA input from NAND gate 515, and DB input from NOR gate 525, a DC input from NOR gate 526, a DD input from OR gate 522 and a DE input from NOR gate 523. Cycle generating circuit 912 produces an ADSEL signal at an output 529 which corresponds to the QC output of flip flop 507. A cycle end signal is output in output 530 which is input at input 131 of reconciliation circuit 911 and corresponds to the output of NAND gate 508. An output 531 produces an $\overline{RAS}$ signal corresponding to the QA output of flip flop 528. A $\overline{CAS}$ signal is output at output 531 corresponding to the QB output of flip flop 528. A $\overline{DTOE}$ signal is output at an output 532 corresponding to the QC output of flip flop 528. A $\overline{WE}$ signal is output at an output 533 corresponding to the QD output of flip flop 528 and a GATE signal is output at an output 535 corresponding to the QE output of flip flop 528. Flip flop 507 is reset by a signal input at an input 502 corresponding to the output 130 of FIG. 4.

Figure 7:
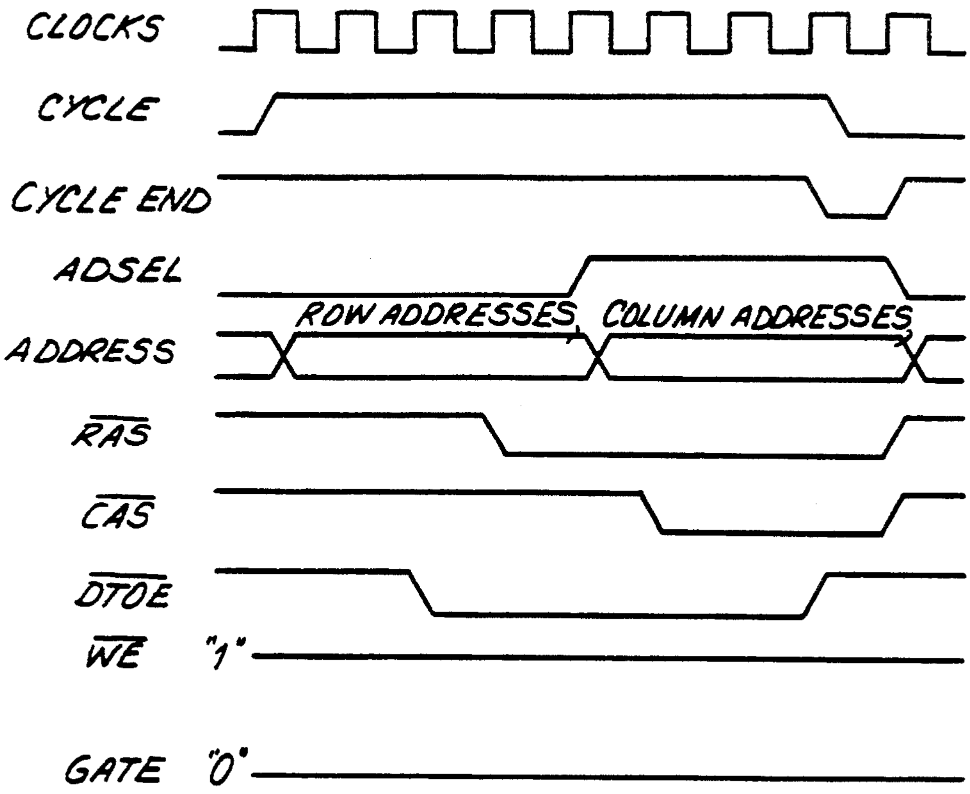
FIG. 7 are the timing signals for performing a display data transfer cycle in accordance with the invention.
Figure 8:
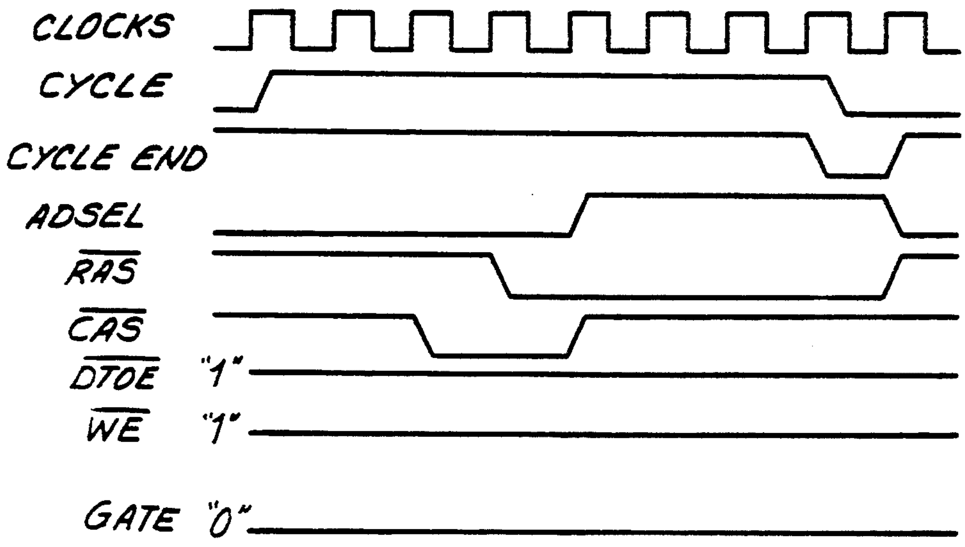
FIG. 8 is a representation of the timing signals for generating a dynamic memory refresh cycle in accordance with the invention.
Figure 9:
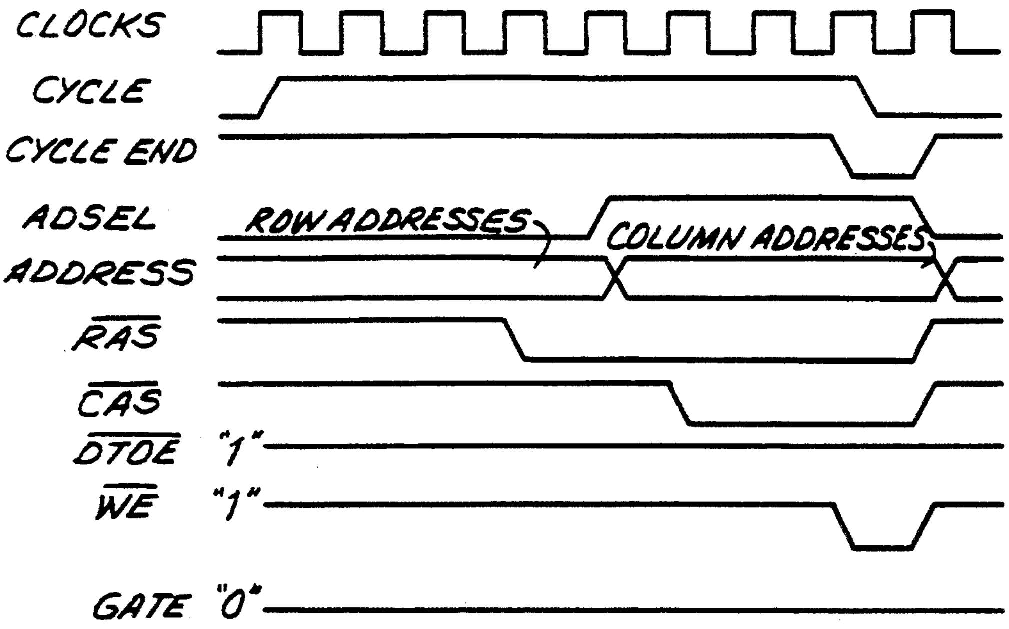
FIG. 9 is a graphical representation of the timing signals for generating the memory write cycle in accordance with the invention.
Figure 10:
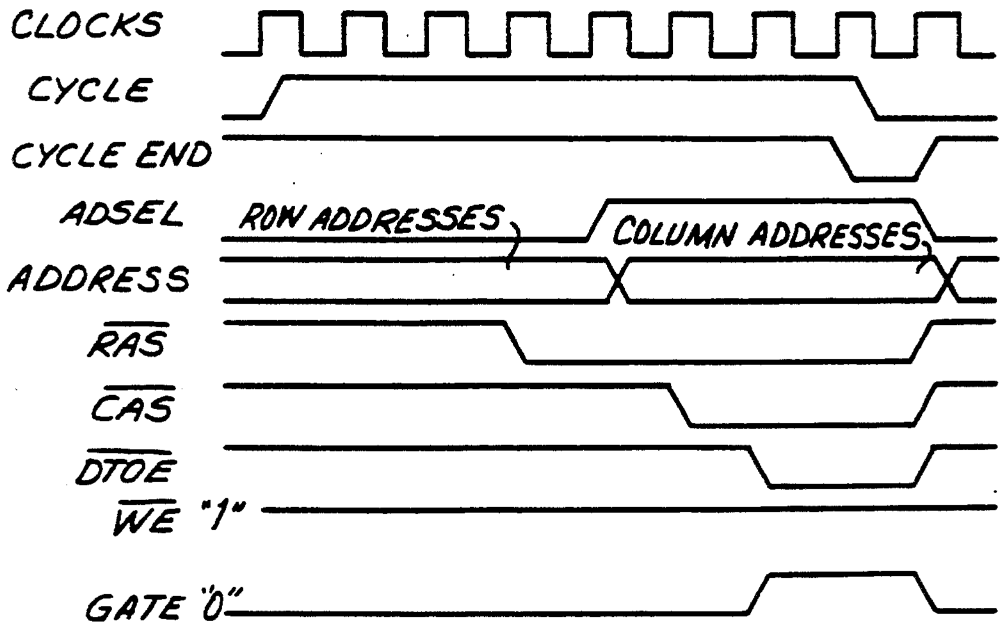
FIG. 10 is a graphical representation of the timing signals for generating the memory read cycle in accordance with the invention.

Cycle generating circuit 912 creates cycles A, B, C or D according to which input signal has a logic value of zero. When an input signal at input 503 has a logic value of zero the cycle shown in FIG. 7 is produced. When the input signal at input 504 has a logic value of zero, the cycle as shown in FIG. 8 is produced When the input signal in input 505 assumes a logic value of zero, the cycle shown in FIG. 9 is produced and if the input signal input at 506 assumes a logic value of zero, the cycle shown in FIG. 10 is produced. In FIGS. 7–10, the clocks signal represents the fundamental clock pulses applied at input 501. The cycle signals represent a cycle execution signal applied at input 502. Cycle N corresponds to the cycle N signal produced at output 530. The ADSEL signals represent the signal output at output 129. The Address signals represent the memory address 940 selected by a multiplexer 916 in accordance with ADSEL signals 944 produced by cycle generating circuit 912 The $\overline{RAS}$ signals represents the signal output at output 531 while the $\overline{CAS}$ signals represents the signal output at output 532. The $\overline{DTOE}$ signals represent the signal output at output 533, the $\overline{WE}$ signals represent the signal output at output 534 and the GATE signal represents the signal output at output 535.

Returning to FIG. 5, a multiplexer A 915 routes display memory address 937 to multiplexer B 916 as cycle A is executed. If cycle A is not executed, multiplexer A passes the information on address bus 931 from microprocessor 901 to multiplexer B. Multiplexer B 916 divides the input address between row addresses for dual port memory 918 and column addresses. Either the row addresses or the column addresses are selected in accordance with ADSEL signal 944. The selected addresses are output as memory address 940.

A wait circuit 914 produces a wait signal input to microprocessor 901 between the instant at which reconciliation circuit 911 receives request 938 for writing or request 939 for reading from microprocessor 901 and the moment in time at which end signal 948 for the cycle arrives from cycle generating circuit 912. The wait signal indicates that the communication is incomplete.

Bidirectional data transceiver 917 having a latch sends data from data bus 932 to local data bus 941 for dual port memory 918 when a write signal is received from microprocessor 901. When a reading operation is performed data input from local data bus 941 is latched by GATE signal 945 produced by cycle generating circuit 912 and is output to data bus 932. Thus, the RAM of dual port memory 918 executes the cycles A, B, C or D as requested. The SAM successfully delivers data 942 which is to be displayed in response to clock pulses 936 output by divider 907.

A palette device 919 selects the colors to be displayed. The palette device 919 produces a signal 943 indicating the three primary colors, red, green and blue which is output to a CRT image display device 905. Display device 905 displays the color indicated by the three primary colors signal 943 at the position scanned by synchronizing signal 942. In this way, the image data transferred from microprocessor 901 to dual port memory 918 is displayed on the CRT image control apparatus.

A fully addressable image display control apparatus has been described above. A text character image display control apparatus may also be similarly operated. Further, the image display device is not limited to a CRT image display device. For example, any other raster scan display device such as a liquid crystal display, a plasma display, or an electroluminescence display can provide a display in the same way.

By providing a cycle reconciliation circuit, the data transfer cycle necessary for a dual port memory can be executed at any time. Therefore, there are no limitations imposed on the setting of the address at which a display is started. Consequently, a display may be begun at any desired position within a memory.

It will thus be seen that the objects set forth above, among those made apparent from the preceding descriptions, are efficiently attained and, since certain changes may be made in the above constructions without departing from the spirit and scope of the invention, it is intended that all matter contained from the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language might be said to fall therebetween.

What is claimed:

1. An image display control apparatus utilizing four cycles, a data transfer cycle, a dynamic memory refresh cycle, a memory write cycle and a memory read cycle for controlling a raster scan display device comprising:

a dual port memory means for storing data to be transferred to the display device for providing a display, said dual port memory means having a first memory permitting data to be written into said dual port memory means and read from said dual port memory means at any moment in time and a second memory permitting data to be sequentially read from said dual port memory means, the dual port memory means being capable of transferring data between said first memory and said second memory during said data transfer cycle for transferring data from said first memory to said second memory, reading from said second memory being performed continuously for displaying data on a horizontal line of said raster scan display device, the capacity of said second memory being smaller than a data quantity necessary for one horizontal scan of said display device, and at least one data transfer from said first memory to said second memory being required during one horizontal scan and said data transfer cycle being performed before the next display data is to be read, after all data in said second memory is read; and cycle reconciliation means for executing said data transfer cycle in which data about to be displayed is transferred between the first memory and said second memory at a desired time, said cycle reconciliation means including logic circuitry for prioritizing said data transfer cycle, dynamic memory refresh cycle, memory write cycle and memory read cycle and selecting the cycle to be executed by assigning the highest priority to the data transfer cycle, said cycle reconciliation means outputting a first request for reserving all of said dynamic memory refresh cycle, memory write cycle and memory read cycle and outputting a second request for said data transfer cycle after a predetermined time period has elapsed from outputting said first request and; means for comparing a display address and a predetermined value and outputting said first request for reserving one of said dynamic memory refresh cycle, memory write cycle and memory read cycle when said display address equals said predetermined value, said predetermined value being sufficient to allow termination of the longest cycle being executed when execution of a current cycle was begun immediately before the request for reserving all of said dynamic memory refresh cycle, memory write cycle and memory read cycle.

2. The image display control apparatus of claim 1, wherein said cycle reconciliation circuit assigns the second highest priority to said dynamic memory refresh cycle, the third highest priority to said memory write cycle and the fourth highest priority to said memory read cycle.

3. The image display control apparatus of claim 2, wherein said logic circuitry includes a plurality of NAND gates and NOR gates for prioritizing said respective cycles.

4. The image display control apparatus of claim 1, wherein said first memory is a random access memory and said second memory is a sequential access memory.

5. The image display control apparatus of claim 1, wherein said cycle reconciliation means includes a register and a plurality of flip flops, said plurality of flip flops triggering said register to produce an output for executing a display data transfer cycle.

6. The image display control apparatus of claim 1, wherein said cycle reconciliation means provides an output indicating the execution of said data transfer cycle and further comprising cycle generating means for receiving said data transfer cycle indication and generating a signal causing data transfer between said first memory and said second memory.

7. The image display control apparatus of claim 1, wherein said cycle reconciliation means outputs a cycle indication signal corresponding to said cycle selected to be executed and further comprising cycle generating means for receiving said cycle indication signal and generating a signal causing said selected cycle to be executed.

8. The image display control apparatus of claim 1, wherein said cycle reconciliation means selects one of said dynamic memory refresh cycle, memory write cycle or memory read cycle in the absence of a request for said data transfer cycle.

9. The image display control apparatus of claim 1, wherein said dual port memory is a single chip.

* * * * *